(12) United States Patent
Yafuso

(10) Patent No.: US 7,508,778 B2
(45) Date of Patent: Mar. 24, 2009

(54) SYSTEM AND METHOD FOR ADJUSTING QUALITY OF SERVICE IN A COMMUNICATION SYSTEM

(75) Inventor: Byron Y. Yafuso, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 660 days.

(21) Appl. No.: 10/313,472

(22) Filed: Dec. 5, 2002

(65) Prior Publication Data

US 2003/0103470 A1  Jun. 5, 2003

Related U.S. Application Data

(60) Provisional application No. 60/337,483, filed on Dec. 5, 2001.

(51) Int. Cl.
*H04M 15/00* (2006.01)
*H04B 1/10* (2006.01)
*H04B 1/44* (2006.01)
*H04Q 7/38* (2006.01)

(52) U.S. Cl. .................. 370/282; 370/229; 370/232; 455/406; 455/450

(58) Field of Classification Search ......... 370/235–282, 370/341–349, 410–474; 709/200–217, 226–228; 455/406–408, 450–455
See application file for complete search history.

(56) References Cited

U.S. PATENT DOCUMENTS

| | | | |
|---|---|---|---|
| 5,778,338 | A | 7/1998 | Jacobs et al. |
| 6,038,452 | A | 3/2000 | Strawczynski et al. |
| 6,088,335 | A | 7/2000 | I et al. |
| 6,278,701 | B1 | 8/2001 | Ayyagari et al. |
| 6,337,973 | B1 | 1/2002 | Agin et al. |
| 6,341,225 | B1 | 1/2002 | Blanc |
| 6,430,398 | B1 | 8/2002 | Blanc |

(Continued)

FOREIGN PATENT DOCUMENTS

EP  1063805  12/2000

(Continued)

OTHER PUBLICATIONS

TIA/EIA-96-C Speech Service Option Standard for Wideband Spread Spectrum Systems, Aug. 1998.

(Continued)

*Primary Examiner*—M. Phan
(74) *Attorney, Agent, or Firm*—D. Scott Juneau; Thomas R. Rouse

(57) ABSTRACT

A system and method for adjusting quality of service in a communication system improves an allocation of resources in a communications environment with shared resources among multiple communicating stations by adjusting quality of service levels based on characteristics of the communicating stations. In a disclosed embodiment, a base station (130) communicates with one or more remote stations (110a, 110b). Quality of service levels for communications between the base station and a remote station 110 are adjusted based on a characteristic of the remote station. In this way, a lower quality remote station can be allocated a lower quality of service level than that allocated to a higher quality remote station, thereby preventing an inefficient allocation of shared resources and improving overall system performance.

59 Claims, 9 Drawing Sheets

U.S. PATENT DOCUMENTS

| | | | |
|---|---|---|---|
| 6,834,341 | B1 | 12/2004 | Bahl et al. |
| 6,873,856 | B2 * | 3/2005 | Voyer .......................... 455/522 |
| 6,907,261 | B2 * | 6/2005 | Mandyam et al. ........... 455/522 |
| 6,931,256 | B2 * | 8/2005 | Mandyam .................... 455/522 |
| 6,999,432 | B2 | 2/2006 | Zhang et al. |
| 7,106,700 | B2 | 9/2006 | Freiberg et al. |
| 2003/0060210 | A1 | 3/2003 | Ravishankar et al. |
| 2004/0136393 | A1 | 7/2004 | Riveiro Insua et al. |

FOREIGN PATENT DOCUMENTS

| | | |
|---|---|---|
| JP | 58-138156 | 8/1983 |
| JP | 02-281848 | 11/1990 |
| JP | 09-326753 | 12/1997 |
| WO | 00014900 | 3/2000 |
| WO | 0078081 | 12/2000 |
| WO | 01013667 | 2/2001 |
| WO | 0150669 | 7/2001 |
| WO | 0154335 | 7/2001 |
| WO | 0156309 | 8/2001 |
| WO | 0182502 | 11/2001 |

OTHER PUBLICATIONS

TIA/EIA/IS-127 Enhanced Variable Rate Codec, Speech Service Option 3 for Wideband Spread Spectrum Digital Systems, 1/97.

TIA/IIA/IS-733 High Rate Speech Service Option 17 for Wideband Spread Spectrum Communication Systems, Mar. 1998.

International Searh Report, PCT/US02/039206, International Search Authority EPO Mar. 12, 2003.

International Preliminary Examination Report Aug. 21, 2006, Search Authority US, Aug. 21, 2006.

* cited by examiner

SYSTEM AND METHOD FOR ADJUSTING QUALITY OF SERVICE IN A COMMUNICATION SYSTEM

CLAIM OF PRIORITY UNDER 35 U.S.C. §119

The present Application for Patent claims priority to Provisional Application No. 60/337,483 entitled "SYSTEM AND METHOD FOR ADJUSTING QUALITY OF SERVICE IN A COMMUNICATION SYSTEM" filed Dec. 5, 2001, and assigned to the assignee hereof and hereby expressly incorporated by reference herein.

BACKGROUND

1. Field

The disclosed embodiments relates to communication systems, and more particularly to a system and method for adjusting quality of service in a communication system.

2. Background

Various techniques are used to provide multiple access communications services to remote stations. One technique used is frequency division multiple access (FDMA). A base station implementing an FDMA scheme assigns a separate frequency band to each remote station. Each remote station transmits using a frequency band assigned by the base station at call setup time. Another technique used is time division multiple access (TDMA). A base station implementing a TDMA scheme assigns multiple remote stations to the same frequency band, but breaks that band into time slots and assigns slots to each remote station. Another multiple access technique, code division multiple access (CDMA) uses spread spectrum communications. Each remote station communicates on a common frequency band at the same time, but their transmissions are encoded using orthogonal codes such as Walsh codes. Because the codes are orthogonal, transmissions from one remote station have the effect of white noise on another remote station. Each of these techniques employs a shared resource that is allocated among multiple remote stations.

Quality of service in a wireless communication system can be represented in terms of data rate, frame error rate, or other signal characteristics. Generally, a higher quality of service can be provided to a particular remote station at a particular time only at the expense of increased consumption of a system resource such as system capacity. For example, increasing the quality of service to one remote station in a multi-user wireless communication system often means that there will be less system capacity available for providing increased quality of service to other remote stations in the system.

In any communication system in which resources are shared, if all communicating stations are assigned the same quality of service but the efficiency of the stations varies, the result is an inefficient allocation of the resource. Lower quality stations consume a disproportionate share of the resource because they need more of the resource to obtain the same quality of service as a higher quality station. Thus, a shared resource might have enough capacity to support a large number of efficient stations, but only a small number of very inefficient stations.

Where a communication system includes a combination of efficient and inefficient stations, a few inefficient stations might consume the entire shared resource. For example, in a CDMA system, transmissions from base stations to remote stations (in a direction referred to as the forward link) occur within a shared frequency band. Transmissions from remote stations to base stations (in a direction referred to as the reverse link) occur within another shared frequency band. When a lower quality remote station requires base stations to transmit forward link signals at a higher power level, this higher power level causes those forward link signals to consume greater forward link system capacity. Likewise, when a lower quality remote station must transmit reverse link signals at higher power, those reverse link signals will consume greater reverse link system capacity. The extra capacity consumed as a result of operating inefficient remote stations in the system decreases the overall number of remote stations that can be supported within the system. In a system that utilizes active power control, the remote station transmits and receives signals at the greatest power near the edge of coverage or at the "handoff boundary" between base stations. Consequently, an inefficient remote station causes the worst loss of system capacity when operating near the boundaries of coverage between base stations.

As a result of the inefficiencies created by lower quality remote stations in conventional systems, CDMA service providers have been reluctant to support remote stations that support subscriber information modules (SIMs). A SIM, also called a "smart card," is a module that plugs into any of a variety of remote station brands and models. The SIM contains data that identifies a specific user account with a service provider. The remote station into which the SIM is plugged gets the service accorded thereto by the user account assigned to the SIM. A specific phone number is assigned to a SIM, not to a phone. A user may change the phone number of a remote station by exchanging one SIM for another. Additionally, a SIM may contain other attributes of the user account, such as billing parameters, an authorized set of types of service, or other aspects of service.

In essence, when a service provider sells a customer a SIM instead of a remote station, the service provider loses the ability to choose the make and model of the remote station that the customer uses on the system. Consequently, the service provider also loses control over the quality and efficiency of the remote stations operating on the system. Service providers fear that users will choose inexpensive remote stations that will ultimately degrade the quality of service or capacity of the system.

Many service providers do allow operation of SIM-capable remote stations on their systems. Such service providers may require their subscribers to select from a specific set of remote station models for which the system is optimized or which are known to operate efficiently. While this approach may maximize the efficiency of the system, it impinges on the customer's freedom to choose a remote station model. Often, the more efficient remote stations will cost more than the less efficient ones. Thus, limiting the customer's choices to only more efficient remote stations may raise the price barrier to entry for potential new customers. There is therefore a need for an approach which allows customers to choose from a greater selection of remote stations without sacrificing system efficiency and capacity.

SUMMARY

Embodiments disclosed herein address the above stated needs by providing a system and method for adjusting quality of service in a communication system based on attributes of each remote station.

Generally speaking, the disclosed embodiments operate to improve metrics of efficiency, capacity, and various measures of quality of service including, for example, but not limited to, data rate, error rate, dropped calls, blocked calls, blocked handoffs, etc. The disclosed embodiments achieve these gains by taking into account characteristics of a remote station in making decisions regarding communications involving that remote station. By contrast, in conventional systems lower quality remote stations consume an inordinate share of resources, driving down overall system performance and forcing many service providers to exclude some types of remote stations. An embodiment may use any characteristic indicative of a quality or efficiency of a remote station to determine an appropriate quality of service level for that remote station. The disclosed embodiments have the added benefit of allowing a service provider to adjust a quality of service level for a remote station for reasons other than the quality of the remote station, based on any characteristic of the remote station, perhaps to achieve a business objective.

In an aspect of the present invention, a method for controlling a communication involving a remote station includes identifying a characteristic of the remote station and causing an adjustment to a quality of service level of the communication based on the characteristic.

In another aspect of the present invention, a remote station apparatus comprises a transmitter for transmitting a characteristic of the remote station and a control processor for interpreting an adjustment to a quality of service level of a communication that was determined based on the characteristic.

In another aspect of the present invention, a base station apparatus comprises a receiver for receiving a characteristic of a remote station and a control processor for selecting a quality of service level of a communication between the base station and the remote station based on the characteristic.

In another aspect of the present invention, a method for allocating a shared resource among a plurality of communicating stations, comprises identifying a first characteristic of a first communicating station, identifying a second characteristic of a second communicating station, determining from the first characteristic and the second characteristic whether the first communicating station has a higher efficiency with respect to the use of the shared resource than the second communicating station, and assigning a lower quality of service level to the second communicating station when the second communicating station has a lower efficiency with respect to the use of the shared resource than the first communicating station.

In another aspect of the present invention, a method for efficiently reducing interference levels in a shared frequency band, comprises identifying a first characteristic of a first receiving station, identifying a second characteristic of a second receiving station, determining from the first characteristic and the second characteristic whether the second receiving station has a lower efficiency than the first receiving station, and allocating a lower quality of service level to a second transmission to the second receiving station than to a first transmission to the first receiving station when the second receiving station has a lower efficiency than the first receiving station.

In yet another aspect of the present invention, a method for controlling communication in a shared frequency band, comprises identifying a characteristic of a transmitter and causing, based on the characteristic, an adjustment to a parameter used in adjusting a power level emitted by the transmitter in the frequency band.

DETAILED DESCRIPTION

An embodiment is directed to a system and method for adjusting quality of service in a communication system in which multiple common users share a resource. The disclosed embodiments are described with respect to a wireless system implementing a multiple access scheme in which multiple remote stations within a common area transmit and receive signals using shared, common frequency bands. Examples of such systems include code division multiple access (CDMA), orthogonal frequency division multiplexing (OFDM), or other forms of spread spectrum communication. CDMA systems include, but are not limited to, systems designed in accordance with IS-95, cdma2000, wideband CDMA (WCDMA), and their progeny. Embodiments might also be utilized in FDMA, TDMA, and ad hoc wireless communication systems, as well as other systems that are known to those skilled in the art.

Figure 1:
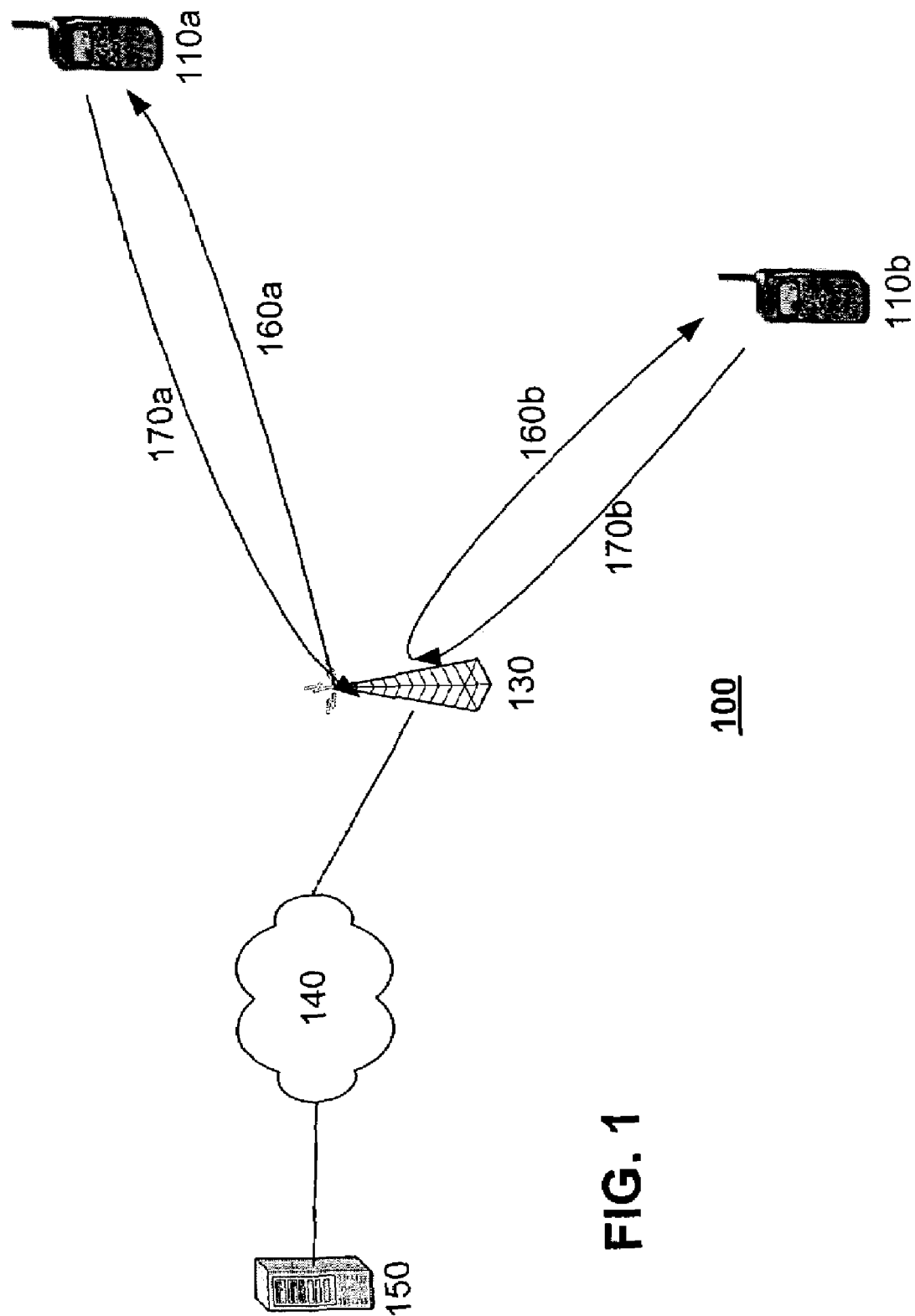
FIG. 1 shows an illustrative operating environment in which an embodiment operates.

FIG. 1 illustrates a spread spectrum wireless communication system 100, including two remote stations (RSs) 110a and 110b, a basestation transceiver subsystem (BTS) 130, a network 140, and a base station controller (BSC) 150 coupled to at least one basestation transceiver subsystem 130. BTS 130 and remote stations 110 are collectively referred to as communicating stations. Control functions may be divided among multiple controllers, such as a base station controller and a mobile switching center, and controller 150 may include one or more of those controllers, as appropriate. In an alternative embodiment, controller 150 may be directly coupled to or may be a part of a communicating station. For example, BTS 130 may be collocated with or integrated into controller 150. Controller 150 is coupled to BTS 130 via network 140.

As illustrated in FIG. 1, network 100 includes two remote stations: a lower quality remote station 110a, and a higher quality remote station 110b. These are referred to collectively as remote stations 110. Each remote station 110 is coupled to BTS 130 by two wireless links: a forward link 160 from BTS 130 to remote station 110, and a reverse link 170 from remote station 110 to BTS 130. For communications from BTS 130 to remote station 110*a*, forward link 160*a* is used, as indicated by the directional arrow. For communications from BTS 130 to remote station 110*b*, forward link 160*b* is used. For communications from remote station 110*a* to BTS 130, reverse link 170*a* is used. For communications from remote station 110*b* to BTS 130, reverse link 170*b* is used.

Communications between BTS 130 and remote station 110 may be established by remote station 110 originating a call, receiving a call, or performing a handoff from a different BTS. According to various embodiments, at some point during a call between BTS 130 and remote station 110, a characteristic of the remote station 110 may be used to cause an adjustment to a communications parameter affecting communication (160,170) between BTS 130 and remote station 110. In particular, the characteristic may be used to cause an adjustment of a quality of service level associated with the communication. The adjustment of the quality of service level, in turn, adjusts the rate at which the particular remote station consumes a shared resource like system capacity or bandwidth.

In general, any station that may be involved in a communication is referred to as a communicating station. This includes BTS 130, remote station 110*a*, and remote station 110*b*. Also, a BTS 130 is commonly referred to simply as a base station, and is so referred to hereinafter in this disclosure.

Various embodiments may be used whenever a plurality of communicating stations, e.g., base station 130 and remote stations 110*a* and 110*b*, are communicating among themselves using a shared resource. In general, a certain amount of resources (e.g., bandwidth) may be available for communication. Various embodiments allow for efficient management of the use of a shared resource, and possibly other related resources as well. The shared resources may be associated with a wire line network, a wireless network, or a hybrid network. Resources affected by a plurality of communicating stations are not necessarily confined to the resources they use directly. For example, in a cellular network, nearby cells will add interference to and suffer interference from each other's communications. Also, communications among remote stations 110 within a cell may interfere with each other.

Communicating stations use communications parameters to characterize their data transmissions. A communications parameter may affect a quality of service of a communication, and could be used to improve or reduce the quality of service. In some embodiments, an improvement in quality of service comes at the expense of the use of more bandwidth or the creation of more interference. Other tradeoffs may be made to improve quality of service in various embodiments as would be apparent.

Quality of service may be adjusted by changing a data rate for voice or other communications, an error rate, an activation/deactivation of optional communications features, and other types of parameters as would be apparent. In some embodiments, an increase in quality of service comes at the expense of system capacity. For example, in a spread spectrum multi-user system, the higher power transmissions associated with the communications of a user allocated a higher level of quality of service creates a higher level of interference with other communications signals, thereby decreasing the quality of service of other users. For example, when signals from a first base station must be transmitted at higher power to a remote station, those higher-power transmissions will cause greater interference to forward link transmissions in neighboring base stations.

Quality of service in some embodiments depends on conditions that vary over time. Therefore, an inherent part of delivering a particular level of quality of service in these embodiments is making measurements to effectuate real-time quality of service control. One metric that can be measured is received signal strength. However, in some embodiments, received signal power is difficult to measure or is not the most relevant measure of a quality of a received signal, so other measurements may be used. Some measurements that may be used include frame error rates, symbol error rates, bit error rates, measured signal-to-noise ratio, and number of dropped packets. Also, some qualities of a signal are important, but difficult to measure directly. For example, where a particular remote station 110 is located in a first cell, it is difficult to measure the interference caused by that remote station 110 in a second, adjacent cell.

In order to achieve the same quality of service, a lower quality remote station may be required to transmit reverse link signals at greater power than a higher quality remote station. For example, a remote station that transmits a more "dirty" signal must transmit more overall power in order that the embedded information signal will be properly received. Some of the transmitted power will only cause noise for the remote station and for signals transmitted by its neighbors. Similarly, in order to achieve the same quality of service, the base station may be required to transmit forward link signals at greater power level to a lower quality remote station than to a higher quality remote station. This may occur if the receiver of the remote station is less efficient at extracting the forward link information from the forward link signal. For example, in communication system 100, if the same quality of service were desired for both lower quality remote station 110*a* and higher quality remote station 110*b*, then the power transmitted on forward link 160*a* and reverse link 170*a* may, for example, exceed the power transmitted on forward link 160*b* and reverse link 170*b*, respectively. This difference in power might occur even if both remote stations are in the same physical location. The resulting increased transmission power to and from remote station 110*a* would interfere with the quality of service provided to remote station 110*b* and other remote stations and base stations in the area.

In order to prevent inefficient use of resources, various embodiments provide for reducing the quality of service allocated to lower quality remote station 110*a*. In doing so, controller 150 ensures that a greater number of remote stations 110 get an appropriate level of quality of service without running out of system resources, e.g., system capacity, etc. Broadly speaking, various embodiments identify a characteristic of a remote station, and adjust a quality of service level based on the characteristic.

A quality of service level of a communication refers to any level of service provided within a protocol framework. For example, if IS-95b (a CDMA protocol) is the protocol used, then some parameters that effect quality of service include an acceptable frame error rate on forward link 160 and on reverse link 170, a data rate transmitted on forward link and on reverse link, a probability of missing a handoff, a probability of disconnect during a call, a probability of blocking a call, a use of text messaging in addition to voice communications, an ability to send and receive fax or HTML messages, various feedback parameters used, power control parameters, etc.

One way to adjust a quality of service level is to alter a communications parameter, such as altering an allowable frame error rate, adjusting a rate at which feedback reports are sent, setting a maximum allowable transmission power on a forward or reverse link, setting a maximum allowable average data rate, setting a maximum allowable signal to noise ratio, etc.

A service provider may be motivated to create a scheme for resource allocation that maximizes the sum over all of the users of a quality of service metric for each user in a cell or within the system. For example, if the shared resource in a particular cell is not fully utilized e.g., during off peak hours, then higher quality of service levels may be provided to all users within the cell. Furthermore, in the event that a higher quality remote station does not require additional quality of service (i.e., it's already operating at a maximum quality of service level) then the resource that would otherwise be allocated to the higher quality remote station could be allocated to lower quality remote stations thereby achieving an overall greater quality of service to all users.

Various characteristics of remote station 110 may be used as factors in selecting a quality of service. In an embodiment, characteristics used to select a particular quality of service level for remote station 110 may include, for example, mobile manufacturer code, manufacturer's model number, firmware revision number, and protocol revision number(s). Other characteristics may be used as would be apparent. If desired, these characteristics may be communicated from remote station 110 to base station 130 through the wireless connection. In an embodiment, they may be sent in a 'status message', 'status response message', or 'extended status response message.' Other messages may be used as also would be apparent. Also, various characteristics of a remote station may be inferred in some embodiments from a unique number permanently associated with the remote station. In an exemplary embodiment, the unique number is referred to as an electronic serial number (ESN). For example, a wireless network may have a priori knowledge that a particular range of ESNs corresponds to a particular manufacturer and/or model of remote stations.

When control information is passed between a remote station 110 and a base station 130, it may be more efficient to transmit indicia of the control information rather than transmitting raw control information. For example, the remote station may transmit an N-bit manufacturer code in lieu of the actual characters representing the name of the manufacturer.

Maintaining a constant quality of service in real time is accomplished using techniques such as adjusting transmitted power, data rate, etc., based on changing wireless channel conditions. In order to maintain a particular quality of service level, various embodiments may keep track of propagation characteristics between base station 130 and remote station 110. One reason this may be useful is the near-far effect. This effect occurs when a base station 130 is fixed in space, and a remote station 110 moves. Unless the location of remote station 110 is known and propagation characteristics are known for each possible location of the remote station, the current propagation characteristics need to be measured directly. In real time quality of service control techniques, a receiving station measures qualities of a signal received from a transmitting station. The receiving station sends signals to the transmitting station that result in adjustments to the power at which the transmitting station transmits. These adjustments compensate for changes in the characteristics of the wireless channel over time. Such changes in the characteristics of the wireless channel over time are often the result of a change in the location of the receiving station or the transmitting station.

Typically, real time quality of service control techniques may be classified into two categories: open loop techniques and closed loop techniques. Open loop and closed loop power control techniques are well known in the art and are described in the context of an IS-95 system in sections 4.3.2 and 7.5.2 of "CDMA RF System Engineering" by Samuel C. Yang, published in 1998 by Artech House, Inc. In IS-95, for example, reverse link open loop power control is used for transmitting access probes. In IS-95 reverse link closed loop power control, the base station transmits a reverse link power control bit in every power control group (PCG), or 800 times per second. The base station varies the value transmitted in the power control bit according to whether the received $E_b/N_0$ (energy-per-bit divided by noise power) exceeds a reverse $E_b/N_0$ set point value. In an exemplary embodiment, the reverse $E_b/N_0$ set point value may be adjusted by the wireless network based on the make and model or other identifying characteristic of the remote station.

A communicating station using a closed loop technique to control its transmissions interprets feedback it receives, which may be indicia of measurements, parameters, or other computed quantities; determines signal parameters based on the feedback; and transmits a data signal in accordance with those parameters.

When a closed loop technique is used to control transmissions of a first communicating station (also referred to as the transmitting station), a second communicating station that receives the transmissions plays a role. The second communicating station (also referred to as the receiving station) measures a quality of a received data signal; determines feedback based on the quality of the data signal; and transmits feedback or indicia of feedback. The closed loop process can be referred to as including two loops: an inner loop in which the second communicating station (i.e., the receiving station) interprets the received signal and generates feedback, and an outer loop in which the first communicating station (also referred to as the transmitting station) receives the feedback and adjusts signal parameters based on the feedback.

Various embodiments provide for flexibility in choosing a quality of service level based on a characteristic of a communication station and in implementing that level once chosen. Furthermore, a quality of service level may be changed at any time, and in fact, may be adjusted dynamically based on past, current, and projected conditions.

One way to adjust a quality of service level is to change a transmitted data rate. Shannon's theorem requires that in order to achieve a higher data rate, more power needs to be transmitted. Both a remote station 110 and a base station 130 can change data rates transmitted on a forward link 160 or a reverse link 170. One way of doing this is to send symbols or frames at a constant rate, where that rate is determined by a quality of service level.

Forward and reverse channel transmission rates are negotiable—input from a remote station 110 is allowed, e.g., to tell a base station 130 what rates it is capable of transmitting and receiving. According with Shannon's Theorem, energy per transmitted symbol is roughly proportional to data rate in an embodiment. Energy per symbol may differ between forward and reverse links, or even on the same link.

Data rates do not have to be constant. They may vary over both short and long term intervals. For example, packets in transmitted frames may be of different power/size levels achieving different data rates within even a single frame. Thus, data rate during a frame may be selected by selecting packet type, e.g., full rate, half rate, quarter rate, eighth rate, or a null packet. Any other rate in between may be obtained by mixing types of packets during transmission according to any algorithm, e.g., first packet is full rate, then N of them half rate, M of them quarter rate, etc. Alternatively, a predetermined portion of full-rate frames can be replaced with half-rate frames in a randomized pattern in order to provide a maximum data rate that is between half and full rate. Standardized techniques for limiting the data rate in wireless voice transmissions are discussed in TIA/EIA-96-C, entitled "SPEECH SERVICE OPTION STANDARD FOR WIDE- BAND SPREAD SPECTRUM SYSTEMS," dated August 1998, TIA/EIA/IS-127, entitled "ENHANCED VARIABLE RATE CODEC, SPEECH SERVICE OPTION 3 FOR WIDEBAND SPREAD SPECTRUM DIGITAL SYSTEMS," dated January 1997, and TIA/EIA/IS-733, entitled "HIGH RATE SPEECH SERVICE OPTION 17 FOR WIDEBAND SPREAD SPECTRUM COMMUNICATION SYSTEMS," dated March 1998.

In these or in other ways, packets may be sent out in a variety of rates with any specified ratio of rates transmitted. A plurality of rates of a plurality of packets may be determined in the ways described or in other ways as would be apparent. Because quality of service can be regulated in real time, a quality of service level does not have to specify a constant quality of service. A wireless communication system may vary quality of service to various remote stations based on any of a number of system criteria. For example, if the system is lightly loaded, such as when there are only a few remote stations involved in active communication with the system, the system may provide a standard level of quality of service to even low-quality remote stations. However, as the wireless communication system becomes more heavily loaded, the system may seek to maximize the number of remote stations that can be serviced by reducing the quality of service provided to some of the remote stations. In this case, the remote stations selected first for reduction in quality of service are the remote stations identified as having lower quality themselves. The selective reduction in quality of service may be based on any of a number of measurable parameters, such as number of active remote stations or overall transmit power level of one or more base stations in the system. The wireless communication system can adjust the quality of service to the selected remote stations by sending messages to the selected remote stations. For example, in an embodiment, the wireless communication system can cause each of the selected remote stations to transmit at reduced reverse link data rate by sending it an in-band control message specifying an adjusted maximum data rate to be used for transmissions. In an alternate embodiment, the wireless communication system may send a broadcast message directing an identified subset of the remote stations to reduce their reverse link quality of service. In addition to the reduction in reverse rate quality of service, the wireless communication system may decrease the forward link data rate to each of the selected remote stations.

The quality of service level to be provided to a particular remote station may be based on a characteristic of the remote station or may be based on various other considerations not specific to a particular remote station. Characteristics of the remote station that might be used include the manufacturer, model, or other hardware or software configuration information. In an embodiment, the wireless communication network obtains such remote station information by retrieving the information over the air or accessing a database within the network that contains this information. Other considerations that are not specific to a single remote station include current communications in a cell and adjacent cells, average call duration, average arrival rate of calls, handoff statistics, and other considerations as would be apparent. An objective function to be optimized by an algorithm implementing a selected quality of service level may incorporate such things as call acceptance and blocking rates, data rates, and dropped calls. An algorithm used to determine data rates and power control may include considerations of efficiency and social utility, current traffic levels at a base station and nearby base stations, and measures of quality of remote stations.

Certain effects of quality of service control have already been mentioned. For example, power control algorithms may be determined by a quality of service level. Also, data rates may be determined, either by being set for the duration of a call, or by being determined dynamically by an algorithm taking into account conditions. In conventional systems, data rate and transmit power are controlled separately. An embodiment allows for them to be done together, in a system in which transmitter and receiver, in either open or closed loop, may reach an optimal quality of service within general constraints based on the interference they produce with other signals and other factors. This may be accomplished through joint voice/channel encoding based on quality of service criteria, or other methods as would be apparent.

Other effects of quality of service control may include features that are enabled, such as text messaging, video, fax, Internet browsing, and associated data rates, error rates, and power levels. Any quality of a communication may be manipulated to trade off interference, time, and bandwidth constraints among various communicating stations with various characteristics as would be apparent.

Quality of service decisions can affect things other than power levels that interfere with other communicating remote stations. In a TDMA system, for example, a quality of service level may affect how much time is allocated to a remote station's communications, e.g., by adjusting size or frequency of time slots. In an FDMA system, quality of service may affect how much bandwidth is allocated, e.g., by changing a guard bandwidth around a transmitter's frequency band. In OFDM, one or more characteristics of a set of frequency bands allocated may be adjusted. Various aspects of TDMA, FDMA, spread spectrum, and other protocols may be used in combination, as would be apparent. Quality of service can describe priority of communications involving one remote station over another. There are many ways to balance performance among various communicating stations.

Feedback may be implemented in many ways, using many types of control information and parameters, possibly using indicia of parameters when parameters are passed between communicating stations. For example, a receiver may transmit indicia of a communications parameter to a transmitter based on a quality (i.e., a measure of performance) of a received signal. These transmissions may be made asynchronously or periodically. The transmitter may use the new communications parameters it receives to adjust a quality of its transmitted data signal. In an embodiment, a base station 130 determines feedback parameters based on a characteristic of a remote station 110, and communicates to remote station 110 any parameters it will use. The parameters that may be used by a communicating station for feedback include operation modes for forward and reverse link quality of service control such as power control, rate control, etc. Also, there may be parameters for both outer loop and inner loop feedback controls. Control parameters may include target frame error rate, minimum signal to noise ratio setpoint, maximum signal to noise ratio setpoint, power control indicator, and other parameters as would be apparent.

Qualities of a signal that may be measured for feedback purposes include signal to noise ratio (SNR), frame error rate, received power, lost packets, ambient interference levels, any kind of fading information, and any other qualities as would be apparent. These quality measurements made by a receiving station may be summarized in a report and sent back to a transmitting station. Alternatively, they may be used to determine parameters and adjustments to parameters, and indicia of those parameters may be sent to the transmitting station. Another alternative would be for the receiving station to transmit raw quality data about a received data signal to the transmitting station continually. Yet another alternative is for the receiving station to send quality reports on demand. In some embodiments, either the transmitting or receiving station can turn on or off any of these or other feedback mechanisms.

A receiving station may control quality of service directly by sending parameters or changes to parameters, or indicia thereof, to a transmitting station. Alternatively, the receiving station may send quality reports that the transmitting station interprets, thereby controlling quality of service indirectly. The receiving station may send feedback periodically, when a threshold or other criterion is reached, or on demand. There are various types of feedback in which no parameter is sent directly, including threshold feedback, incremental feedback, periodic report feedback, and erasure indicator bit feedback. Each of these and other types of feedback may be characterized by parameters that describe how the feedback is implemented, and what the thresholds, adjustments, and other effects are.

In threshold feedback, a receiving station monitors a quality of a received signal and transmits an indication or a report when the quality crosses a threshold. A transmitting station applies a quality of service increment when the threshold feedback indication is received. In an embodiment, a transmitting station gradually degrades a quality of a transmitted signal, such as power. The receiving station monitors the quality of the signal received from the transmitting station. The receiving station may monitor any of the various criteria discussed above, such as frame error rates, symbol error rates, bit error rates, etc. When the quality of the received signal dips below a threshold, the receiving station sends a feedback indication to the transmitting station. Then, responsive to the feedback indication, the transmitting station improves the quality of the transmitted signal. In an embodiment, the quality of the transmitted signal is improved by a fixed amount. In another embodiment, the quality of the transmitted signal is improved by a variable amount. The "power measurement report message" featured in the aforementioned IS-95 standards is an example of threshold feedback.

In incremental feedback, a receiving station sends an increment or indicia of an increment at regular intervals. The indicia may be a single bit indicating either an "up" or a "down" adjustment to a quality of service parameter such as transmit power. In an embodiment, a receiving station periodically sends a single bit to the transmitting station, with each bit indicating either an increase or a decrease in the transmitting station's transmit power. For example, the receiving station may send one bit every 1.25 milliseconds. Upon receiving an "up bit," the transmitting station increases the power of the signal transmitted to the receiving station by an "up adjustment amount." Upon receiving a "down bit," the transmitting station decreases the power of the signal transmitted to the receiving station by a "down adjustment amount." The "up adjustment amount" may have the same value as the "down adjustment amount," or may be different.

In periodic report feedback, a receiving station creates a report of a quality of a received signal over a period of time and sends the report to the transmitting station. The way in which the report is created may be adjusted by a parameter. A transmitting station interprets the periodic report to adjust a quality of service level of a transmitted data signal. The ways in which a report can be created include recording how many frames were received, and how many were received correctly, in a time interval of a given duration.

In erasure indicator bit feedback, the receiving station sends rapid, real time descriptors of a quality of a received signal, such as whether the latest frame was received correctly. For example, where the transmitting station transmits one frame every 20 milliseconds, the receiving station sends an erasure indicator bit to the transmitting station every 20 milliseconds indicating whether the previous frame was received without errors. In an embodiment, a '1' indicates a frame received with errors (also known as an erasure), and a '0' indicates a frame received without errors. An example of use of erasure indicator bits is described in detail in ANSI/TIA/EIA-95-B-1999 (especially section 6.2.2.3). A transmitting station interprets the feedback as it comes in to make adjustments to a quality of a transmitted signal. The feedback may be interpreted, e.g., through a filter.

Figure 2:
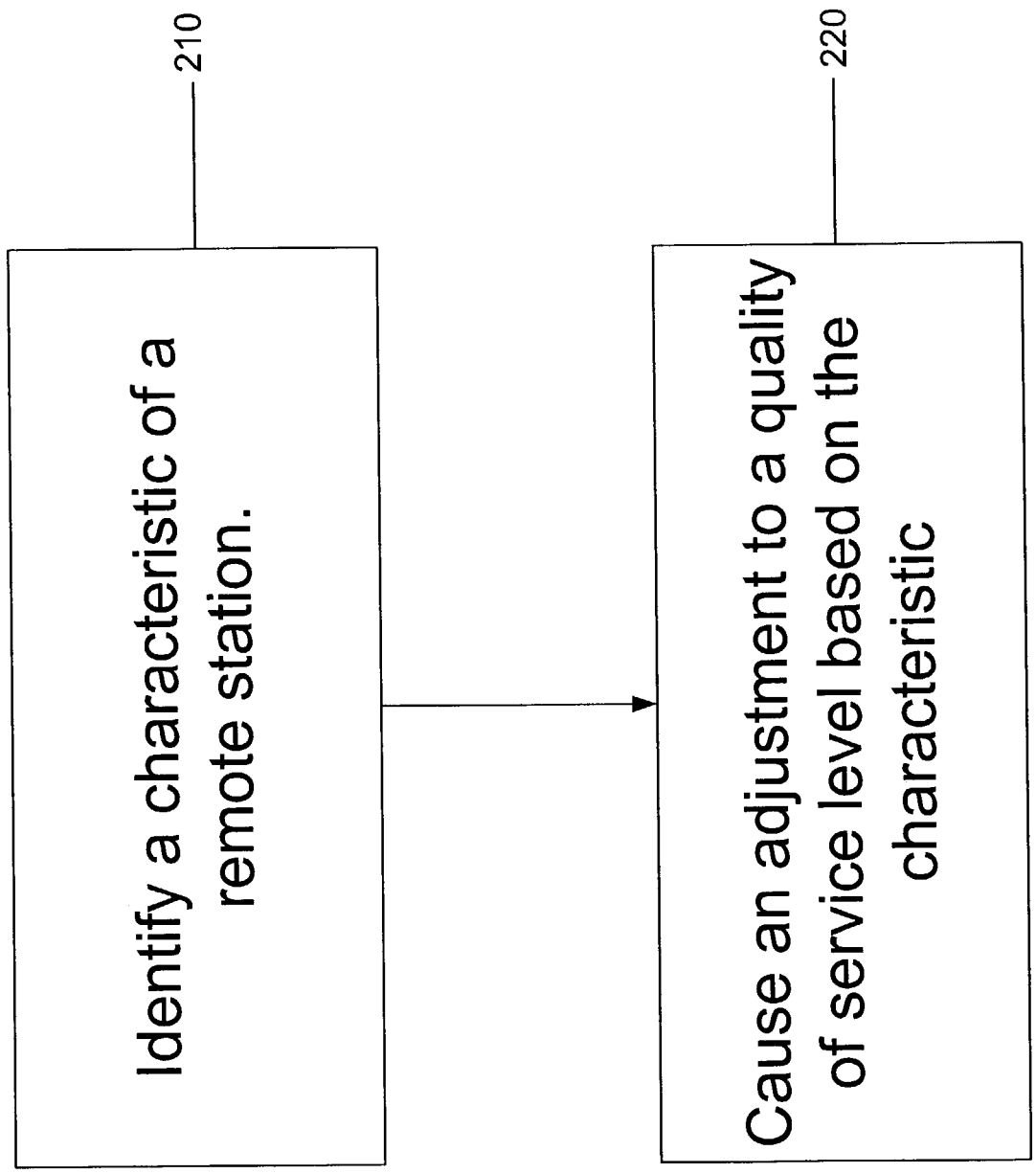
FIG. 2 is a flowchart illustrating an operation of an embodiment in which an adjustment to quality of service is based on a characteristic.

FIG. 2 illustrates the operation of an exemplary embodiment. In operation 210, a characteristic of a remote station is identified. The characteristic may be identified actively or passively, locally or remotely, internally or by receiving the characteristic or indicia thereof, in a base station or a remote station, or in other ways as would be apparent. In an embodiment, a remote station sends a message to a base station indicating a manufacturer of the remote station. In an embodiment, a remote stations sends a message to a base station indicating a model of the remote station. In operation 220, an adjustment to a quality of service level is caused based on the characteristic, whether the characteristic is the manufacturer, the model, or indicates both the manufacturer and model. The causation may be active or passive, done in a transmitter or a receiver, a remote station or a base station, or in other ways as would be apparent. In an embodiment, the base station sends the remote station a message directing the remote station to limit the maximum data rate transmitted by the remote station to a value less than full rate. In addition, the cause may have an effect that will be enacted locally, remotely, or a combination thereof. The quality of service level may be static or dynamic, independent or a function of conditions, etc. The adjustment may be a change to a quality of service level, a selection of a quality of service level, a creation of a quality of service level, etc.

Figure 3:
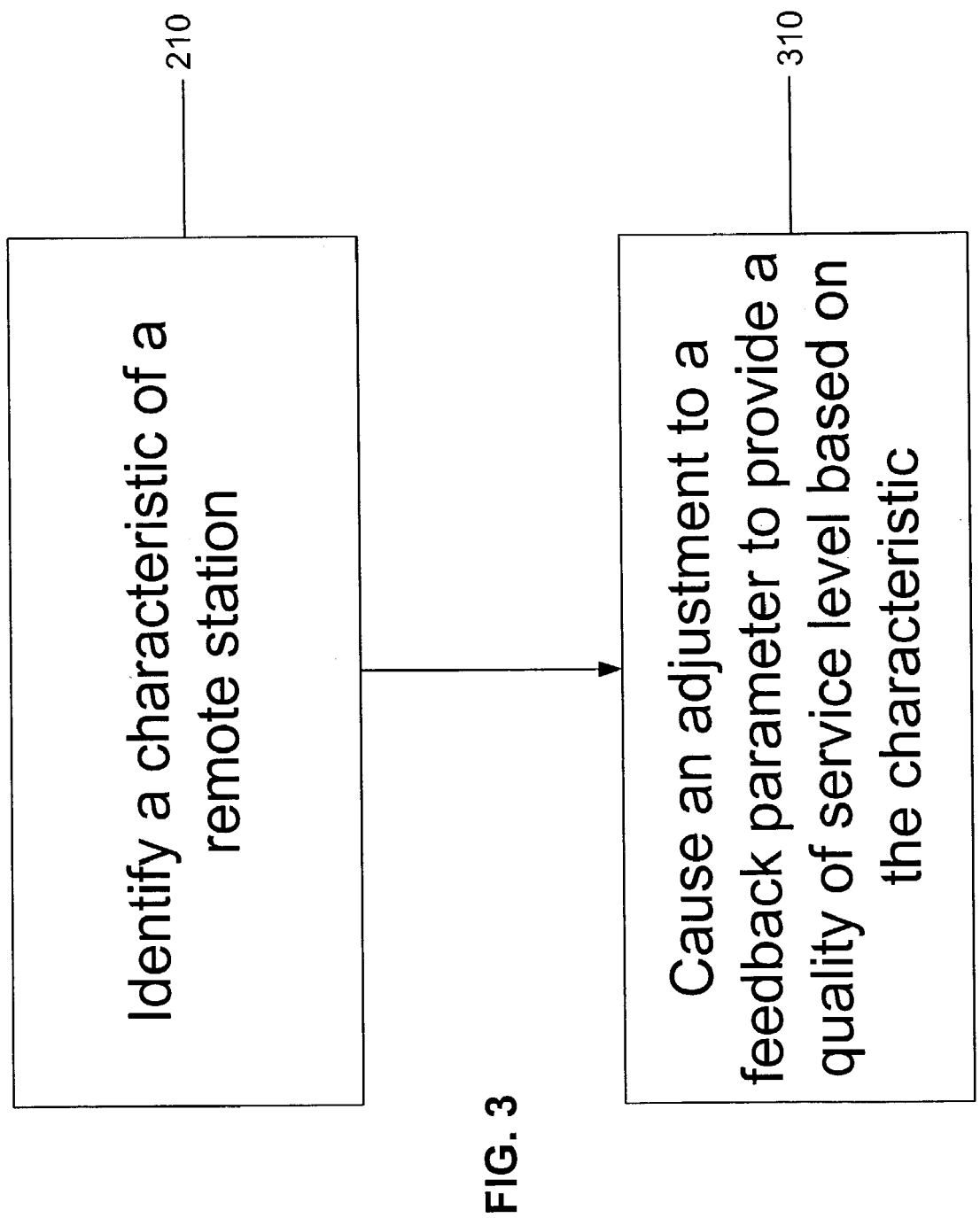
FIG. 3 is a flowchart illustrating an operation of an embodiment in a closed loop system in which a feedback parameter is adjusted to provide a quality of service based on a characteristic.

FIG. 3 illustrates a closed loop. implementation of an exemplary embodiment. In operation 210, a characteristic of a remote station is identified, as discussed above. In operation 310, an adjustment to a feedback parameter is caused based on the characteristic to provide a quality of service level. The feedback parameter may be used in any feedback algorithm as would be apparent. In an embodiment, the feedback parameter that is adjusted is a threshold used by the remote station in sending incremental feedback signals to a base station.

Figure 4:
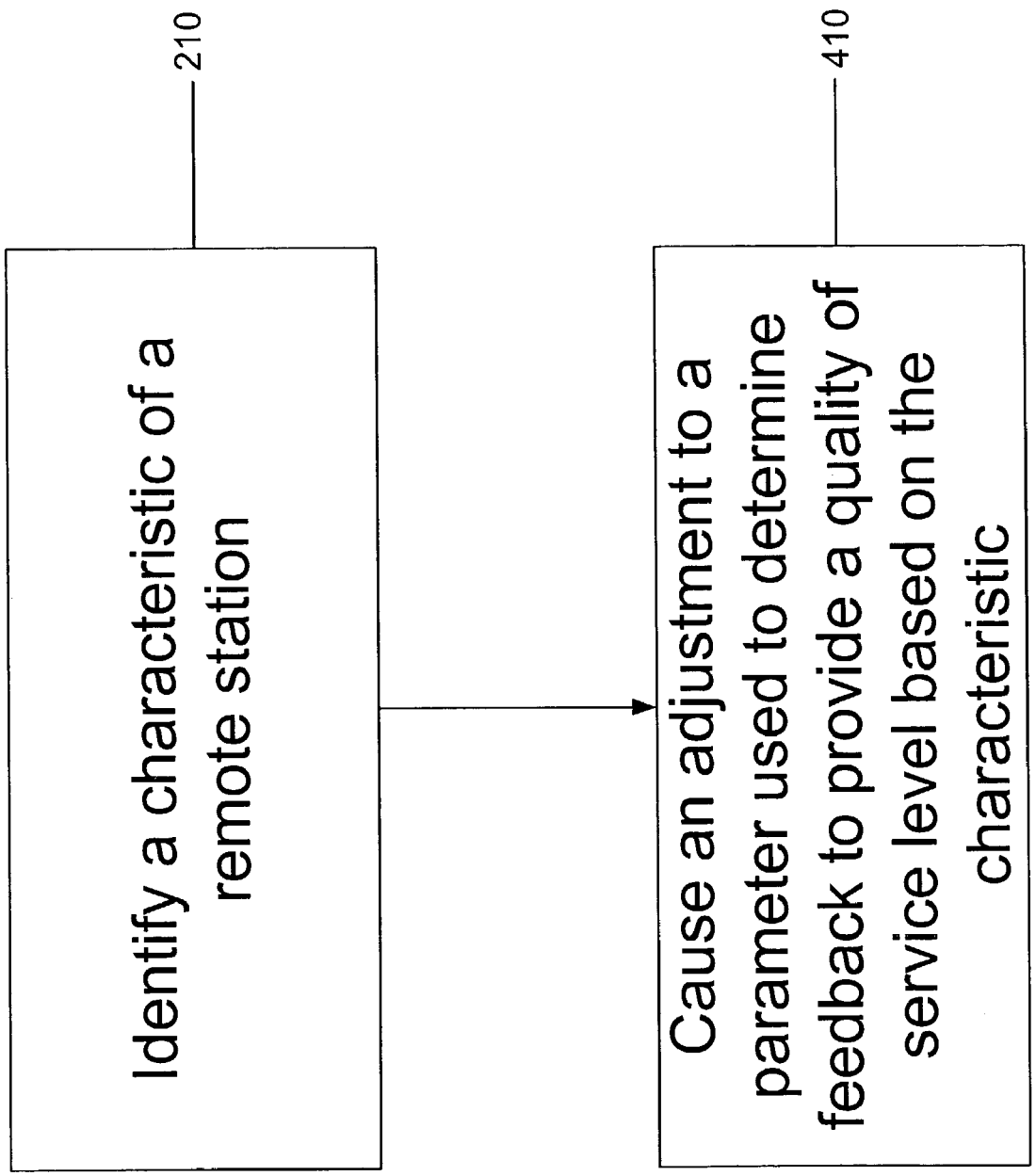
FIG. 4 is a flowchart illustrating an operation of an embodiment in a closed loop system in which a parameter used to determine feedback is adjusted to provide quality of service based on a characteristic.
Figure 5:
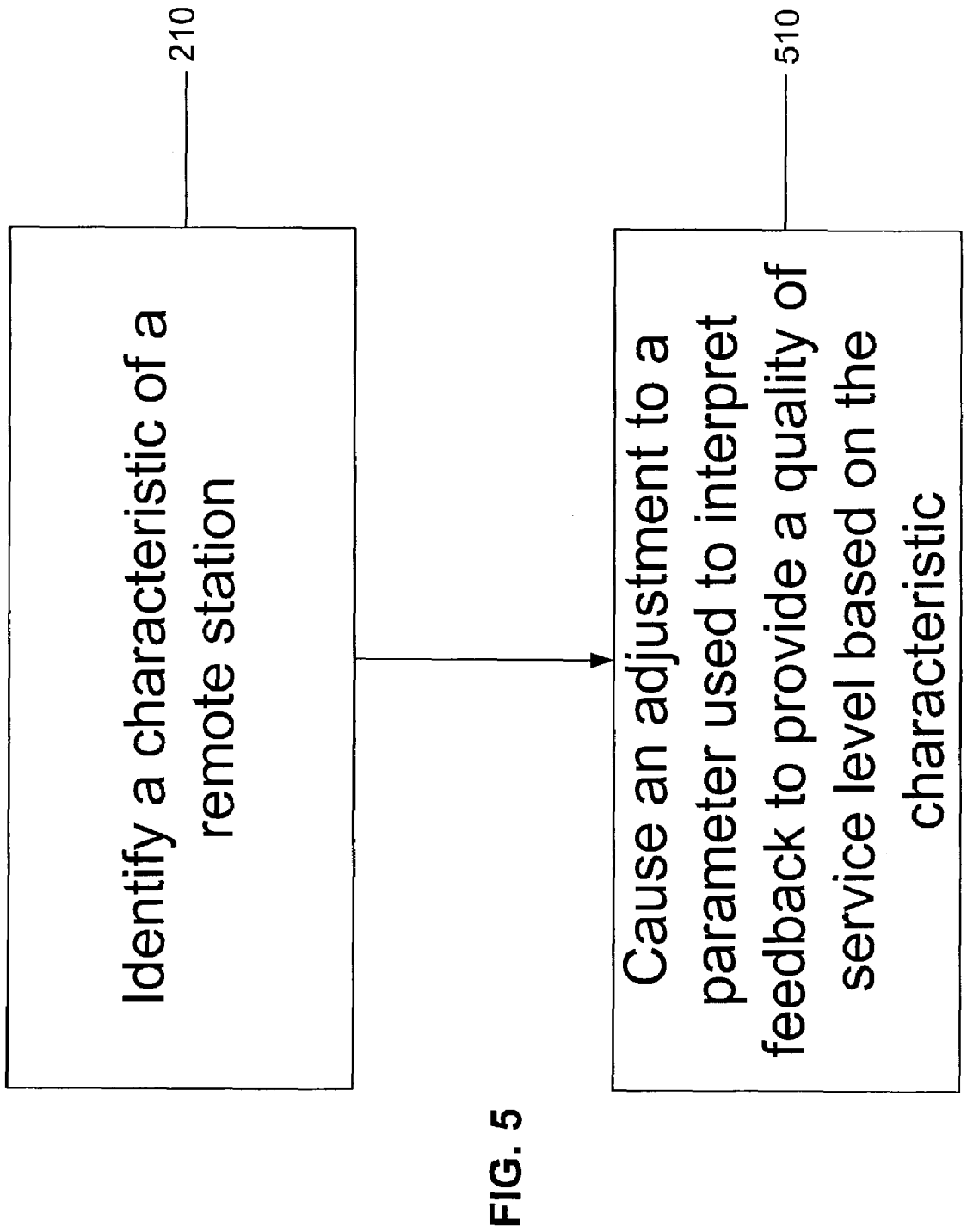
FIG. 5 is a flowchart illustrating an operation of an embodiment in a closed loop system in which a parameter used to interpret feedback is adjusted to provide quality of service based on a characteristic.

FIGS. 4 and 5 illustrate specific closed loop embodiments of the embodiment illustrated in FIG. 3. FIG. 4 illustrates an embodiment in which an adjustment to a feedback process at a receiving station is caused. In operation 210, a characteristic of a remote station is identified. In operation 410, an adjustment to a parameter used to determine feedback is caused to provide a quality of service level based on the characteristic. FIG. 5 illustrates an embodiment in which an adjustment to a feedback process at a transmitting station is caused. In operation 210, a characteristic of a remote station is identified. In operation 510, an adjustment to a parameter used to interpret feedback is caused to provide a quality of service level based on the characteristic.

Figure 6:
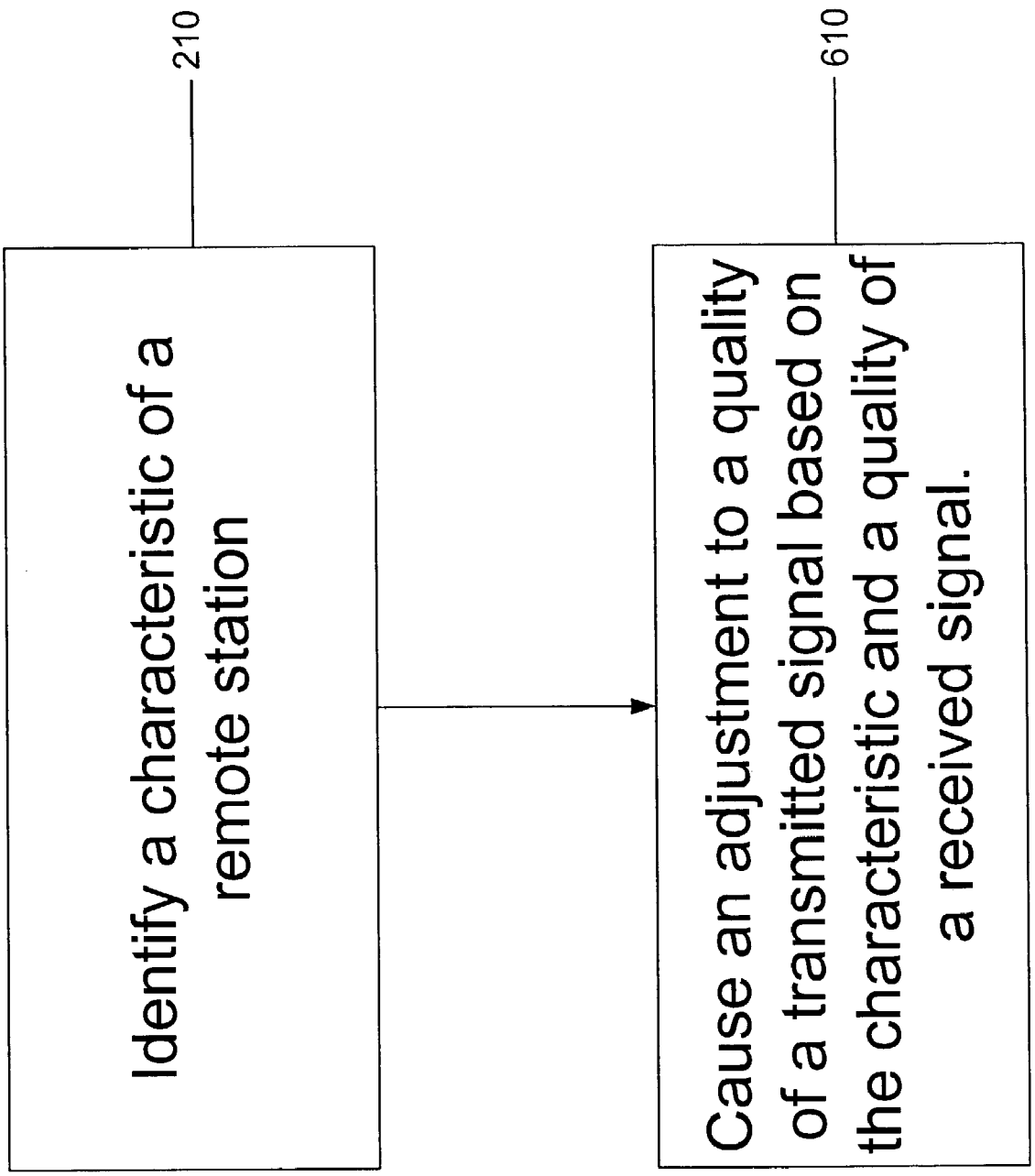
FIG. 6 is a flowchart illustrating an operation of an embodiment in an open loop system.

FIG. 6 illustrates an open loop implementation of an exemplary embodiment. In operation 210, a characteristic of a remote station is identified. In operation 610, an adjustment to a quality of a transmitted signal is made based on the characteristic and a quality of a received signal. A simple example of a process implementing the operations in FIG. 6 would be if a transmitting station based the power level of a transmitted data signal on a received power of a received data signal.

Figure 7:
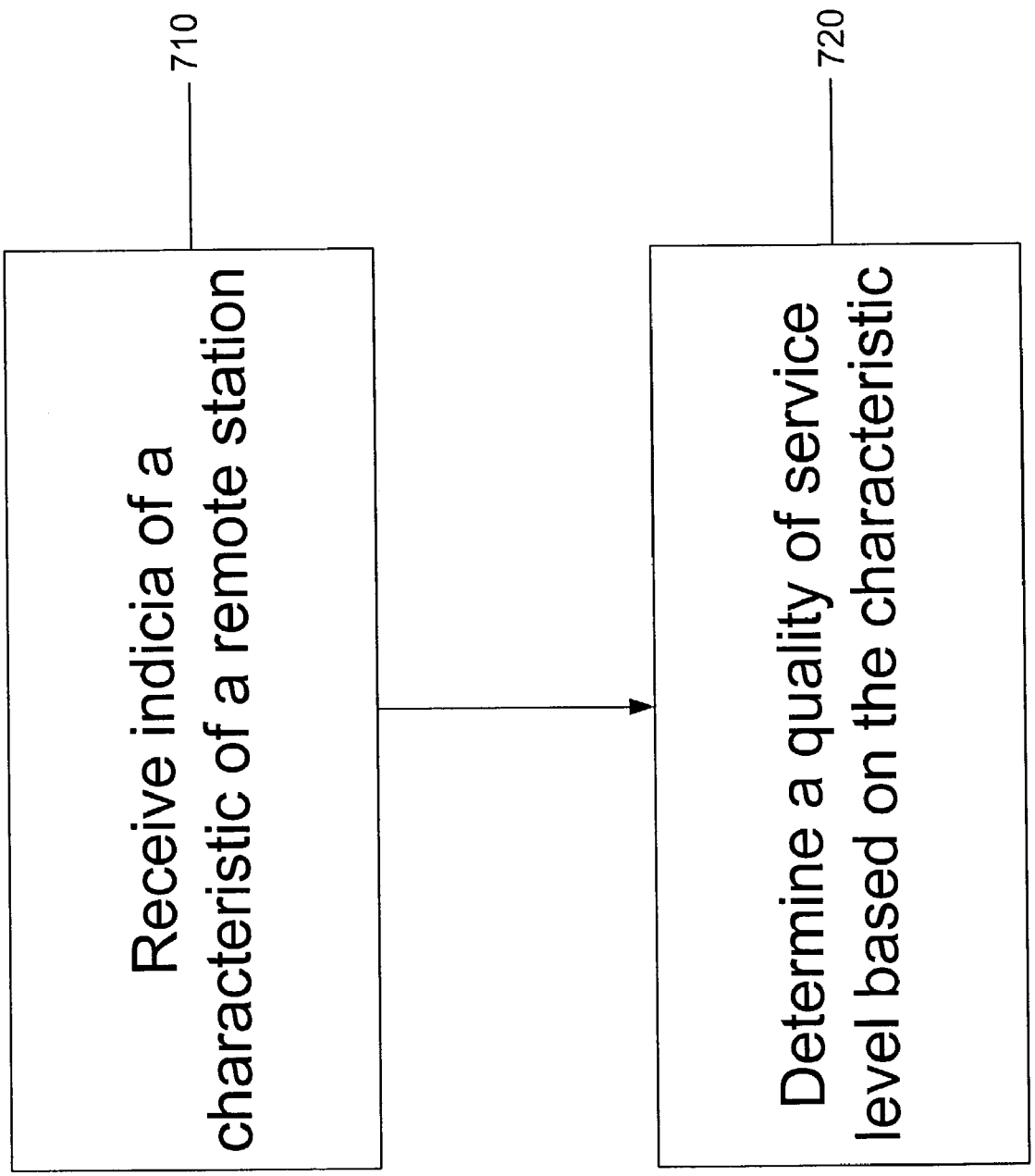
FIG. 7 is a flowchart illustrating an operation of an embodiment in a system in which a quality of service level is determined by an entity other than the remote station.

FIG. 7 illustrates a specific closed loop embodiment of the embodiment illustrated in FIG. 6. In operation 710, indicia of a characteristic of a remote station are received at base station 130. These indicia may be any agreed upon data from which a characteristic of the remote station can be inferred, and may range in size from a single bit of data to any number of bits. In operation 720, a quality of service level is determined based on the characteristic.

Figure 8:
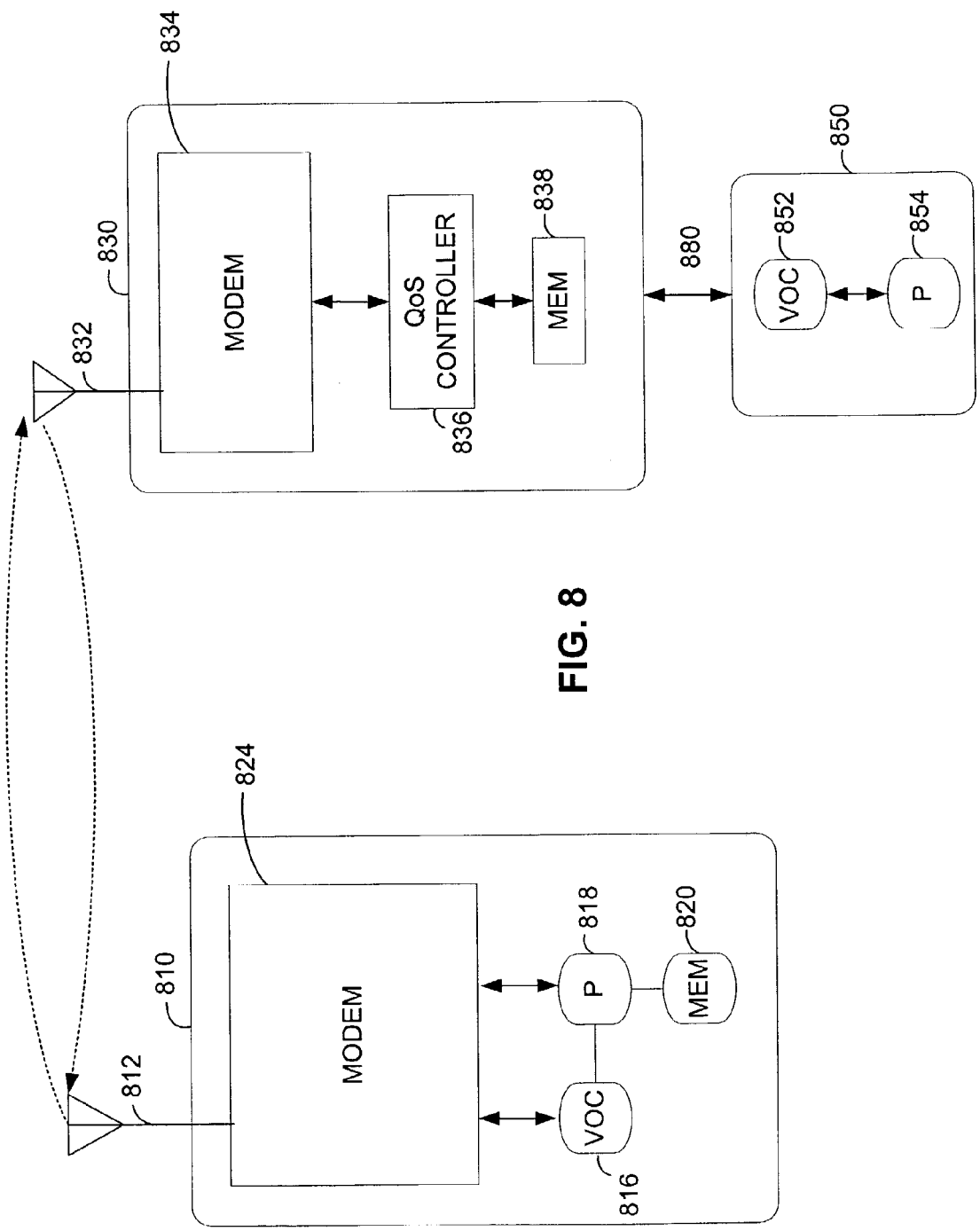
FIG. 8 illustrates a spread spectrum wireless communication system 800, including a remote station, a base station, and a base station controller in accordance with an embodiment.

FIG. 8 illustrates a spread spectrum wireless communication system 800, including a remote station 810, a BTS 830, and a BSC 850 in accordance with an embodiment. The forward link 860 involves transmissions from the BTS 830 to the remote station. The reverse link 870 involves transmissions from the remote station 810 to the base station 830. Link 880 couples the BTS 830 with the BSC 850.

The remote station 810 includes an antenna 812, a modem 814, a vocoder 816, a processor 818, and memory 820. The antenna 812 is coupled to the modem 814. The modem 814 is coupled to the vocoder 816 and the processor 818. The vocoder is coupled to the processor 818. The processor is coupled to the memory 820.

The antenna 812 receives signals from BTSs via the forward link and transmits signals to BTSs via the reverse link. The remote station 810 also includes a receiver (not shown) that filters, amplifies, downconverts and digitizes the received signal. The modem 814 includes a demodulator (not shown) that demodulates the digitized signal. The demodulator performs the inverse of signal processing functions performed at the sending base station. For example, the demodulator may perform de-interleaving, decoding, and frame check functions. The demodulated signal is provided to the processor 818, which then can store data extracted from the demodulated signal into the memory 820.

The vocoder 816 compresses and codes frames of digitized speech samples at the remote station 810, thereby creating vocoded data of a remote station user's voice. The function of the vocoder is to compress the digitized speech signal into a low bit rate signal by removing natural redundancies inherent in speech. An illustrative vocoder is disclosed in U.S. Pat. No. 5,778,338 entitled "VARIABLE RATE VOCODER," issued Jul. 7, 1998, assigned to the assignee of the present invention. The vocoded data is provided to the modem 814. The modem 814 includes a modulator (not shown) that modulates the vocoded data, creating a modulated signal. The remote station 810 also includes a transmitter (not shown) that upconverts, filters, and amplifies the modulated signal for over the air reverse link transmission through the antenna 812.

The memory 820 stores various characteristics of the remote station 810, which may be used as factors in selecting a quality of service. In an embodiment, characteristics used to select a particular quality of service level for the remote station 810 may include, for example, mobile manufacturer code, manufacturer's model number, firmware revision number, and protocol revision number(s). Both dynamic and static characteristics may be used to select a particular quality of service level for the remote station 810. Other characteristics may be used as would be apparent. In an embodiment, characteristics of the remote station are also located in hardware. An example characteristic of the remote station that may be found in hardware is an ASIC revision number.

The memory 820 may also store indicia of a characteristic of the remote station 810, which may be used as factors in selecting a quality of service. In an embodiment, indicia of characteristics of a remote station may include, for example, a vocoder rate, a quality of a link, and other indicia as would be apparent.

These characteristics and indicia are transmitted from the remote station 810 to the base station 830 through reverse link 870, and from the base station 830 to the BSC 880 through link 880. In an embodiment, they may be sent in a 'status message', 'status response message', 'extended status response message,' or any other message as would be apparent.

In an embodiment, these characteristics and indicia may be transmitted to the base station 830 in response to a BSC message requesting these characteristics and indicia. The BSC 850 determines when to request that these characteristics and indicia be transmitted to the base station 830 and from the base station 830 to the BSC 850. In an alternate embodiment, these characteristics and indicia may be transmitted to the base station 830 in a message scheduled by the remote station 810.

Figure 9:
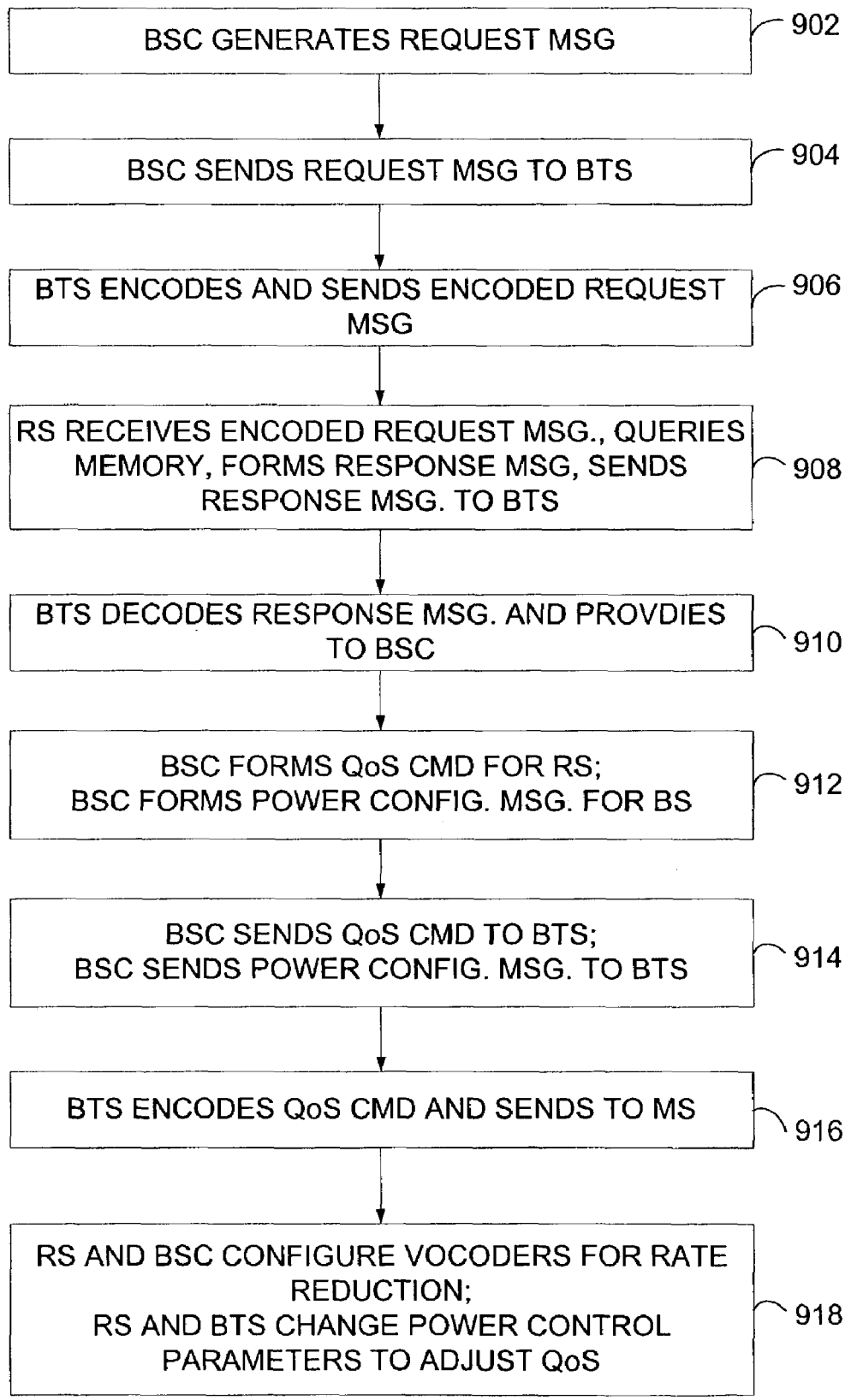
FIG. 9 is a flowchart illustrating a method for adjusting a quality of service level in accordance with an embodiment.

FIG. 9 is a flowchart illustrating a method for adjusting a quality of service level in accordance with an embodiment. In step 902, the BSC 850 generates a request message that will eventually be transmitted to the remote station 810. The request message requests that the remote station send characteristics and indicia of characteristics of the remote station 810 back to the BSC 850.

In step 904, the BSC 850 sends the request message to the base station 830 via link 880. The BSC 850 includes a vocoder 852 and a processor 854. The vocoder 852 is coupled to the processor 854. The vocoder 852 compresses and codes frames of digitized speech samples at the BSC 850, thereby creating vocoded data destined for a remote station.

In step 906, the base station receives the request message from the BSC 850 and encodes the request message, thereby creating an encoded request message, and sends the encoded request message to the remote station 810. The base station 830 includes an antenna 832, a modem 834, a quality of service (QoS) controller 836, and memory 838. The antenna 832 is coupled to the modem 834. The modem 834 is coupled to the quality of service controller 836. The quality of service controller 836 is coupled to the memory 838.

In step 908, the remote station 810 receives the encoded request message and decodes the encoded request message. The remote station 810 queries its memory 820 for the characteristics and indicia of characteristics of the remote station 810 requested within the request message, and forms a response message. The response message includes the characteristics and indicia of characteristics of the remote station 810 that was requested. The remote station 810, then sends the response message to the base station 830 via the reverse link 860.

The antenna 832 receives signals from remote stations via the reverse link 860 and transmits signals to remote stations via the forward link 870. The base station 830 includes a receiver (not shown) that filters, amplifies, downconverts and digitizes the received signal. The modem 834 includes a demodulator (not shown) that demodulates the digitized signal. The demodulator performs the inverse of signal processing functions performed at the sending remote station. For example, the demodulator may perform de-interleaving, decoding, and frame check functions. The demodulated signal is provided to the QoS controller 836, which then can store data extracted from the demodulated signal into the memory 838. The demodulated signal includes messages received from the remote station 810.

In step 910, the base station 830 decodes the response message and provides the decoded response message to the BSC 850 via link 880. In an embodiment, the BSC 850 determines characteristics and indicia of characteristics of the remote station 810 from the decoded response messages it receives from the base station 830. In an embodiment, the base station 830 determines characteristics and indicia of characteristics of the remote station 810 from the quality of the reverse link 860. In an embodiment, the processor 854 infers various characteristics and indicia of characteristics of the remote station 810.

In an embodiment, the BSC 850 identifies a characteristic of the remote station and causes an adjustment to quality of service based on the characteristic. In another embodiment, the BSC 850 identifies a characteristic of the remote station and causes an adjustment to a feedback parameter to provide a quality of service level based on the characteristic. In yet another embodiment, the BSC 850 identifies a characteristic of the remote station and causes an adjustment to a parameter used to determine feedback to provide a quality of service level based on the characteristic. In another embodiment, the BSC 850 identifies a characteristic of the remote station and causes an adjustment to a parameter used to interpret feedback to provide a quality of service level based on the characteristic. In another embodiment, the BSC 850 identifies a characteristic of the remote station and causes an adjustment to a quality of a transmitted signal based on the characteristic and quality of the received signal. In yet another embodiment, the BSC 850 receives indicia of a characteristic of a remote station and adjusts a quality of service level based on the characteristic.

In step 912, the BSC 850 adjusts the quality of service level by forming a QoS command for the remote station 810. The QoS command commands the remote station 810 to change its quality of service. In an embodiment, the remote station 810 changes its quality of service by decreasing its reverse link power, its vocoder rate, or any other parameter that would change quality of service as would be apparent to those skilled in the art.

In addition to forming the QoS command, the BSC 850 generates a power configuration message for the base station 830 based on the adjusted quality of service in accordance with an embodiment. The power configuration message commands the power of the forward link 870 based on the adjusted quality of service.

In step 914, the BSC 850 sends the QoS command to the base station 830. In addition to the QoS command, the BSC 850 sends the power configuration message to the base station 830 in accordance with an embodiment. The quality of service controller 836 stores any quality of service parameters such as power control parameters, vocoder rate parameters, feedback parameters, parameters used to determine feedback, parameters used to interpret feedback, qualities of the received signal, qualities of the transmitted signal, received indicia of a characteristic of a remote station, and quality of service indications into the memory 838.

In step 916, the base station 830 encodes the QoS command that it receives from the BSC 850 and sends the encoded QoS command to the remote station 810. The remote station 810 decodes the QoS command and adjusts its quality of service level according to the QoS command.

In step 918, the remote station 810 and the BSC 850 configure their vocoders by adjusting their vocoder rate based on the adjusted quality of service level. In addition, the remote station 810 and the base station 830 adjust their power control parameters based on the adjusted quality of service level. Power control parameters include a power control set point and magnitude of an up or down power command.

A power control loop can be used to control the power of the reverse link transmission. In an embodiment, a power control loop can be used to measure the reverse link transmission power at the base station and provide feedback to the remote station 810 to adjust the reverse link transmission power. The feedback signal can be in the form of a power control command, which is generated by comparing the measured reverse link transmission power with a power control set point at the base station. If the measured reverse link transmission power is below the set point, then the feedback signal provided to the remote station 810 is used to increase the reverse link transmission power. If the measured reverse link transmission power is above the set point, then the feedback signal provided to the remote station 810 is used to decrease the reverse link transmission power. Thus, the power of the forward link 870 can be adjusted by adjusting the set point. In an embodiment, the power control set point is adjusted based on the power configuration message from the BSC 850.

In an embodiment, a quality of service on a forward link transmission is not impacted if loading on the forward link 860 is below a threshold. Likewise, in an embodiment, a quality of service on a reverse link transmission is not impacted if loading on the reverse link 870 is below a threshold. In an embodiment, adjustment of the quality of service on a communication link is based not only on a characteristic or indicia of a characteristic of the remote station 810, but also on the loading of the communication link. In an embodiment, the less the loading on the communication link, the less an adjustment of quality of service on the communication link.

Those of skill in the art would understand that information and signals described herein may be represented using any of a variety of different technologies and techniques. For example, data, information, signals, and bits that may be referenced throughout the above description may be represented by voltages, currents, electromagnetic waves, magnetic fields or particles, optical fields or particles, or any combination thereof. A remote station, as referred to herein, may be a cellular, PCS or other wireless phone, wireless modem or other wireless communication device.

Those of skill would further appreciate that the various illustrative algorithm operations described in connection with the embodiments disclosed herein may be implemented as electronic hardware, computer software, or combinations of both. To clearly illustrate this interchangeability of hardware and software, various illustrative components and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative operations and functions described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The operations of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to a processor such the processor can read information from, and write information to, the storage medium. Alternatively, the storage medium may be integral to the processor. The processor and the storage medium may reside in an ASIC. The ASIC may reside in a communicating station such as a base station or remote station, or a controller. In the alternative, the processor and the storage medium may reside as discrete components in a communicating station or controller.

In addition to the various embodiments described herein, other embodiments and variations are within the scope of the following claims. For example, decisions regarding quality of service may be made by a remote station, or jointly. Furthermore, in various embodiments of the present invention, there need not be a base station; for example a wireless ad hoc network may be utilized. The communication system need not be spread spectrum or wireless; for example it may be a wired LAN or other communications network. The signal controlled doesn't have to be a data signal; it may be a control signal as well.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for controlling a communication involving a remote station, comprising:

identifying a characteristic of the remote station; and causing an adjustment to a quality of service level of the communication based on said characteristic, wherein said causing an adjustment comprises causing an adjustment to a parameter based on said characteristic, thereby adjusting said quality of service level of the communication, wherein said causing an adjustment comprises causing an adjustment to a feedback parameter based on said characteristic, thereby adjusting said quality of service level of the communication, and wherein said causing an adjustment comprises one of the group including causing an adjustment to a parameter associated with incremental feedback based on said characteristic, thereby adjusting said quality of service level, causing an adjustment to a parameter associated with threshold feedback based on said characteristic, thereby adjusting said quality of service level, causing an adjustment to a parameter associated with periodic report feedback based on said characteristic, thereby adjusting said quality of service level, and causing an adjustment to a parameter associated with erasure indicator bit feedback based on said characteristic, thereby adjusting said quality of service level.

2. The method of claim 1, wherein said causing an adjustment comprises causing an adjustment to includes a parameter of a transmitted signal based on said characteristic, thereby adjusting said quality of service level of the communication.

3. The method of claim 2, wherein said causing an adjustment comprises causing an adjustment to a parameter of a transmitted signal based on said characteristic and a quality of a received signal, thereby adjusting said quality of service level of the communication.

4. The method of claim 1, wherein said identifying a characteristic of the remote station comprises identifying one of a manufacturer of the remote station, a model of the remote station, and a number uniquely associated with the remote station.

5. The method of claim 4, wherein said identifying a characteristic of the remote station comprises identifying an electronic serial number of the remote station.

6. The method of claim 1, wherein said identifying a characteristic of the remote station comprises receiving indicia of said characteristic.

7. The method of claim 1, wherein said identifying a characteristic of the remote station comprises transmitting a request for said characteristic.

8. The method of claim 1, wherein said identifying a characteristic of the remote station comprises receiving said characteristic.

9. The method of claim 1, wherein said identifying a characteristic of the remote station comprises transmitting said characteristic.

10. The method of claim 1, wherein said identifying a characteristic of the remote station comprises transmitting indicia of said characteristic.

11. The method of claim 1, wherein said causing an adjustment to a quality of service level comprises causing an adjustment to a transmitted power level based on said characteristic, thereby adjusting said quality of service level of the communication.

12. The method of claim 1, wherein said causing an adjustment to a quality of service level comprises causing an adjustment to a transmitted data rate based on said characteristic, thereby adjusting said quality of service level of the communication.

13. The method of claim 12, wherein said causing an adjustment to a transmitted data rate comprises causing an adjustment to a rate of a packet to be transmitted.

14. The method of claim 12, wherein said causing an adjustment to a transmitted data rate comprises causing an adjustment to a plurality of rates of a plurality of packets to be transmitted.

15. The method of claim 1, wherein said causing an adjustment to a quality of service level comprises causing an adjustment one of a transmitted power level and a transmitted data rate, based on said characteristic, thereby adjusting said quality of service level of the communication.

16. The method of claim 1, wherein said causing an adjustment comprises causing an adjustment to a quality of service level of a data communication based on said characteristic.

17. The method of claim 1, wherein said causing an adjustment comprises causing an adjustment to a quality of service level of the voice communication based on said characteristic.

18. The method of claim 1, wherein said causing an adjustment comprises causing an adjustment to a quality of service level implemented by an algorithm controlling the communication based on said characteristic.

19. The method of claim 1, wherein said causing an adjustment comprises selecting said quality of service level of the communication based on said characteristic.

20. The method of claim 19, wherein said selecting said quality of service level comprises uniquely identifying said quality of service level from said characteristic.

21. The method of claim 1, wherein said causing an adjustment comprises receiving indicia of said quality of service level, wherein said quality of service level was determined based on said characteristic.

22. The method of claim 1, wherein said causing an adjustment comprises selecting said adjustment to said quality of service level based on said characteristic.

23. The method of claim 1, wherein said causing an adjustment to a quality of service level comprises causing an adjustment to a quality of service level of a wireless communication based on said characteristic.

24. The method of claim 23, wherein said causing an adjustment to a quality of service level comprises causing an adjustment to a quality of service level of one of a spread spectrum communication, an FDMA communication, and a TDMA communication, based on said characteristic.

25. The method of claim 23, wherein said causing an adjustment to a quality of service level comprises causing an adjustment to a quality of service level of the cellular communication based on said characteristic.

26. The method of claim 25, wherein said causing an adjustment to a quality of service level comprises causing an adjustment to a quality of service level of the spread spectrum communication based on said characteristic.

27. The method of claim 26, wherein said causing an adjustment to a quality of service level comprises causing an adjustment to a quality of service level of the CDMA communication based on said characteristic.

28. The method of claim 26, wherein said causing an adjustment to a quality of service level comprises causing an adjustment to a quality of service level of the OFDM communication based on said characteristic.

29. The method of claim 1, wherein said causing an adjustment to a parameter comprises causing an adjustment to a parameter associated with a signal transmitted by the remote station based on said characteristic, thereby adjusting said quality of service level of the communication.

30. The method of claim 1, wherein said causing an adjustment to a parameter comprises transmitting indicia of said adjustment to said parameter, thereby adjusting said quality of service level of the communication.

31. The method of claim 1, wherein said causing an adjustment to a parameter comprises transmitting indicia of said parameter, thereby adjusting said quality of service level of the communication.

32. The method of claim 1, wherein said causing an adjustment to a parameter comprises receiving indicia of said adjustment to said parameter, thereby adjusting said quality of service level of the communication.

33. The method of claim 1, wherein said causing an adjustment to a parameter comprises receiving indicia of said parameter, thereby adjusting said quality of service level of the communication.

34. The method of claim 1, wherein said causing an adjustment to a parameter comprises causing an adjustment to a parameter associated with a signal received by the remote station based on said characteristic.

35. The method of claim 1, wherein said causing an adjustment to a parameter associated with incremental feedback comprises causing, based on said characteristic, an adjustment to a parameter used to determine an increment based on a quality level of a received signal, thereby adjusting said quality of service level of the communication.

36. The method of claim 1, wherein said causing an adjustment to a parameter associated with incremental feedback comprises causing, based on said characteristic, an adjustment to a parameter used to determine the size of an increment, thereby adjusting said quality of service level of the communication.

37. The method of claim 1, wherein said causing an adjustment to a parameter associated with incremental feedback comprises one of the group including causing, based on said characteristic, an adjustment to a parameter used to determine an increment based on a quality level of a received signal, thereby adjusting said quality of service level of the communication, and causing, based on said characteristic, an adjustment to a parameter used to determine the size of an increment, thereby adjusting said quality of service level of the communication.

38. The method of claim 1, wherein said causing an adjustment to a parameter associated with threshold feedback comprises causing, based on said characteristic, an adjustment to a parameter used to adjust a quality level of a received signal required to transmit a threshold feedback, thereby adjusting said quality of service level of the communication.

39. The method of claim 1, wherein said causing an adjustment to a parameter associated with threshold feedback comprises causing, based on said characteristic, an adjustment to a parameter used to adjust a quality of service increment applied when a threshold feedback is received, thereby adjusting said quality of service level of the communication.

40. The method of claim 1, wherein said causing an adjustment to a parameter associated with periodic report feedback comprises causing, based on said characteristic, an adjustment to a parameter used to create a report of a quality of a received signal over a period of time, thereby adjusting said quality of service level of the communication.

41. The method of claim 1, wherein said causing an adjustment to a parameter associated with periodic report feedback comprises causing, based on said characteristic, an adjustment to a parameter used to interpret a periodic report to adjust a quality of service level of a communication.

42. The method of claim 1, wherein said causing an adjustment to a parameter associated with periodic report feedback comprises one of the group including causing, based on said characteristic, an adjustment to a parameter used to create a report of a quality of a received signal over a period of time, thereby adjusting said quality of service level of the communication, and causing, based on said characteristic, an adjustment to a parameter used to interpret a periodic report to adjust a quality of service level of a communication.

43. The method of claim 1, wherein said causing an adjustment comprises causing an adjustment to a parameter associated with erasure indicator bit feedback based on said characteristic, thereby adjusting said quality of service level of the communication.

44. The method of claim 1, wherein said causing an adjustment to a feedback parameter comprises causing an adjustment to a parameter used to determine feedback based on said characteristic, thereby adjusting said quality of service level of the communication.

45. The method of claim 1, wherein said causing an adjustment to a feedback parameter comprises causing an adjustment to a parameter used to interpret feedback based on said characteristic, thereby adjusting said quality of service level of the communication.

46. The method of claim 1, wherein said causing an adjustment to a feedback parameter comprises causing an adjustment to a parameter associated with feedback transmitted by the remote station.

47. The method of claim 46, further comprising selecting, by the remote station, a feedback signal.

48. The method of claim 47, further comprising transmitting, by the remote station, a feedback signal.

49. The method of claim 46, further comprising receiving a feedback signal from the remote station.

50. The method of claim 1, wherein said causing an adjustment to a feedback parameter comprises causing an adjustment to a parameter associated with feedback received by the remote station.

51. The method of claim 50, further comprising selecting a feedback signal.

52. The method of claim 51, further comprising transmitting a feedback signal to the remote station.

53. The method of claim 50, further comprising receiving, by the remote station, a feedback signal.

54. A remote station apparatus comprising:
a transmitter for transmitting a characteristic of the remote station; and
a control processor for interpreting an adjustment to a quality of service level of a communication that was determined based on said characteristic, wherein said control processor is further adapted for causing an adjustment to a parameter based on said characteristic, thereby adjusting said quality of service level of the communication, wherein said causing an adjustment comprises causing an adjustment to a feedback parameter based on said characteristic, thereby adjusting said quality of service level of the communication, and wherein said causing an adjustment comprises one of the group including causing an adjustment to a parameter associated with incremental feedback based on said characteristic, thereby adjusting said quality of service level, causing an adjustment to a parameter associated with threshold feedback based on said characteristic, thereby adjusting said quality of service level, causing an adjustment to a parameter associated with periodic report feedback based on said characteristic, thereby adjusting said quality of service level, and causing an adjustment to a parameter associated with erasure indicator bit feedback based on said characteristic, thereby adjusting said quality of service level.

55. A base station apparatus comprising:
a receiver for receiving a characteristic of a remote station; and
a control processor for selecting a quality of service level of a communication between the base station and said remote station based on said characteristic, wherein said control processor is further adapted for causing an adjustment to a parameter based on said characteristic, thereby adjusting said quality of service level of the communication, wherein said causing an adjustment comprises causing an adjustment to a feedback parameter based on said characteristic, thereby adjusting said quality of service level of the communication, and wherein said causing an adjustment comprises one of the group including causing an adjustment to a parameter associated with incremental feedback based on said characteristic, thereby adjusting said quality of service level, causing an adjustment to a parameter associated with threshold feedback based on said characteristic, thereby adjusting said quality of service level, causing an adjustment to a parameter associated with periodic report feedback based on said characteristic, thereby adjusting said quality of service level, and causing an adjustment to a parameter associated with erasure indicator bit feedback based on said characteristic, thereby adjusting said quality of service level.

56. A method for controlling communication in a shared frequency band, comprising:
identifying a characteristic of a transmitter; and
causing, based on said characteristic, an adjustment to a parameter used in adjusting a power level emitted by said transmitter in the frequency band, wherein said causing an adjustment comprises causing an adjustment to the power level based on said characteristic, thereby adjusting said quality of service level of the communication, wherein said causing an adjustment comprises causing an adjustment to a feedback parameter based on said characteristic, thereby adjusting said quality of service level of the communication, and wherein said causing an adjustment comprises one of the group including causing an adjustment to a parameter associated with incremental feedback based on said characteristic, thereby adjusting said quality of service level, causing an adjustment to a parameter associated with threshold feedback based on said characteristic, thereby adjusting said quality of service level, causing an adjustment to a parameter associated with periodic report feedback based on said characteristic, thereby adjusting said quality of service level, and causing an adjustment to a parameter associated with erasure indicator bit feedback based on said characteristic, thereby adjusting said quality of service level.

57. A method for controlling a communication involving a remote station, comprising:
identifying a characteristic of the remote station; and
causing an adjustment to a quality of service level of the communication based on said characteristic, wherein said causing an adjustment comprises causing an adjustment to a parameter based on said characteristic, thereby adjusting said quality of service level of the communication, wherein said causing an adjustment comprises causing an adjustment to a feedback parameter based on said characteristic, thereby adjusting said quality of service level of the communication, wherein said causing an adjustment comprises causing an adjustment to a parameter associated with threshold feedback based on said characteristic, thereby adjusting said quality of service level of the communication, and wherein said causing an adjustment to a parameter associated with threshold feedback comprises one of the group including causing, based on said characteristic, an adjustment to a parameter used to adjust a quality level of a received signal required to transmit a threshold feedback, thereby adjusting said quality of service level of the communication, and causing, based on said characteristic, an adjustment to a parameter used to adjust a quality of service increment applied when a threshold feedback is received, thereby adjusting said quality of service level of the communication.

58. A method for controlling a communication involving a remote station, comprising:
identifying a characteristic of the remote station; and
causing an adjustment to a quality of service level of the communication based on said characteristic, wherein said causing an adjustment comprises causing an adjustment to a parameter based on said characteristic, thereby adjusting said quality of service level of the communication, wherein said causing an adjustment comprises causing an adjustment to a feedback parameter based on said characteristic, thereby adjusting said quality of service level of the communication, wherein said causing an adjustment comprises causing an adjustment to a parameter associated with periodic report feedback based on said characteristic, thereby adjusting said quality of service level of the communication; wherein said causing an adjustment comprises causing an adjustment to a parameter associated with erasure indicator bit feedback based on said characteristic, thereby adjusting said quality of service level of the communication, and wherein said causing an adjustment to a parameter associated with erasure indicator bit feedback comprises causing, based on said characteristic, an adjustment to a parameter of a filter accepting erasure indicator bits as input and used to determine feedback, thereby adjusting said quality of service level of the communication.

59. A remote station apparatus comprising:

means for transmitting a characteristic of the remote station; and means for interpreting an adjustment to a quality of service level of a communication that was determined based on said characteristic, wherein the means for interpreting further comprises means for causing an adjustment to a parameter based on said characteristic, thereby adjusting said quality of service level of the communication, wherein said causing an adjustment comprises causing an adjustment to a feedback parameter based on said characteristic, thereby adjusting said quality of service level of the communication, and wherein said causing an adjustment comprises one of the group including causing an adjustment to a parameter associated with incremental feedback based on said characteristic, thereby adjusting said quality of service level, causing an adjustment to a parameter associated with threshold feedback based on said characteristic, thereby adjusting said quality of service level, causing an adjustment to a parameter associated with periodic report feedback based on said characteristic, thereby adjusting said quality of service level, and causing an adjustment to a parameter associated with erasure indicator bit feedback based on said characteristic, thereby adjusting said quality of service level.

* * * * *